(12) United States Patent
Kameshima

(10) Patent No.: US 7,973,895 B2
(45) Date of Patent: Jul. 5, 2011

(54) ANTIGLARE FILM HAVING FIRST AND SECOND PARTICLES WITH DIFFERENT AVERAGE DIAMETERS

(75) Inventor: Hisamitsu Kameshima, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 317 days.

(21) Appl. No.: 12/246,424

(22) Filed: Oct. 6, 2008

(65) Prior Publication Data

US 2009/0096972 A1    Apr. 16, 2009

(30) Foreign Application Priority Data

Oct. 10, 2007   (JP) ................................ 2007-264127

(51) Int. Cl.
  *G02F 1/1335*   (2006.01)
  *G02B 27/00*   (2006.01)
(52) U.S. Cl. .......................... 349/137; 349/112; 359/614
(58) Field of Classification Search .................. 349/112, 349/113, 137; 359/614
  See application file for complete search history.

(56) References Cited

U.S. PATENT DOCUMENTS 6,572,961 B1 * 6/2003 Koyama et al. ............... 428/323
6,852,376 B2 * 2/2005 Chien et al. .................... 428/1.3

FOREIGN PATENT DOCUMENTS

| JP | 06-018706 | 1/1994 |
|---|---|---|
| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-260748 | 9/2003 |
| JP | 2004-004777 | 1/2004 |

* cited by examiner

*Primary Examiner* — Brian M. Healy
*Assistant Examiner* — Paul C Lee
(74) *Attorney, Agent, or Firm* — Squire, Sanders & Dempsey (US) LLP

(57) ABSTRACT

An antiglare film includes an antiglare layer having a binder matrix, and particles A and particles B therein on a transparent substrate. A difference in density between the particles A and particles B is 0.2 g/cm$^3$ or less. The quotient value ($R_A$/H), which is obtained by division of the average diameter of the particles A ($R_A$) by the average thickness of the antiglare layer (H), is in the 0.40-0.80 range. The quotient value ($R_B$/$R_A$), which is obtained by division of the average diameter of the particles B ($R_B$) by the average diameter of the particles A ($R_A$), is in the 0.20-0.60 range. The quotient value (($w_A$+$w_B$)/$w_M$), which is obtained by dividing the sum of the content of the particles A ($w_A$) and that of the particles B ($w_B$) in the antiglare layer ($w_A$+$w_B$) by the content of the binder matrix in the antiglare layer ($w_M$), is in the 0.10-0.40 range. The quotient value ($w_B$/$w_A$), which is obtained by division of the content of the particles B ($w_B$) by that of the particles A ($w_A$) in the antiglare layer, is in the 0.50-1.50 range.

4 Claims, 4 Drawing Sheets

ANTIGLARE FILM HAVING FIRST AND SECOND PARTICLES WITH DIFFERENT AVERAGE DIAMETERS

CROSS REFERENCE TO RELATED APPLICATION

This application is based on and claims the benefit of priority from the Japanese Patent Application number 2007-264127, filed on Oct. 10, 2007; the entire contents of which are incorporated herein by reference.

BACKGROUND OF THE INVENTION

1. Field of the Invention

The present invention relates to an antiglare (AG) film that is provided on the surface of a window, a display, and the like. In particular, the present invention relates to an antiglare film that is provided on the surface of a display such as a liquid crystal display (LCD), a CRT display, an organic electroluminescence display (ELD), a plasma display (PDP), a surface electric field display (SED), and a field emission display (FED).

2. Description of the Related Art

In the field of displays such as LCD, CRT displays, ELD, and PDP, providing on the display surface an antiglare film having a concave-convex structure on the surface is known as means for preventing the degradation of visibility caused by reflection of external light on the display surface during viewing.

The following methods are known for producing such antiglare films:
  a method of forming a concave-convex structure on an antiglare film surface by emboss processing;
  a method of coating a coating liquid obtained by admixing particles to a binder matrix forming material and dispersing the particles in the binder matrix, thereby forming a concave-convex structure on an antiglare film surface.

In an antiglare film having on the surface thereof a concave-convex structure formed by the above-described methods, the external light falling on the antiglare film is scattered by the concave-convex structure of the surface. As a result, the image of external light becomes smudgy and the degradation of visibility caused by the reflection of external light on the display surface can be prevented.

In the antiglare film in which convexities and concavities have been formed on the surface by emboss processing, surface convexities and concavities can be completely controlled. As a result, reproducibility is good. However, the problem is that where defects or foreign matter are present on the emboss roll, the defects spaced by a roll pitch appear on the film.

On the other hand, an antiglare film using a binder matrix and particles can be produced by using fewer operations than the antiglare film employing the emboss processing. As a result, the antiglare film can be manufactured at a low cost. Accordingly, antiglare films of a variety of forms in which particles are dispersed in a binder matrix are known (Japanese Patent Application Publication (JP-A-6-18706) No. 6-18706).

Various techniques have been disclosed with respect to antiglare films using a binder matrix and particles. For example, the following methods for producing antiglare films using a binder matrix and particles have been disclosed:
  a method using a binder matrix resin, spherical particles, and particles of irregular shape (JP-A-2003-260748);
  a method using a binder matrix resin and particles of a plurality of different diameters (JP-A-2004-004777);
  a method of using a film having surface convexities and concavities in which the cross-sectional area of convexities is specified (JP-A-2003-004903).

The following methods have also been disclosed:
  a method of using internal scattering in combination with external scattering and setting an internal haze of an antiglare film to 1-15% and a surface haze to 7-30% (JP-A-11-305010);
  a method of using a binder resin and particles with a size of 0.5-5 µm and setting the difference in refractive index between the resin and the particles to 0.02-0.2 (JP-A-11-326608);
  a method of using a binder resin and particles with a size of 1-5 µm and setting the difference in refractive index between the resin and the particles to 0.05-0.15, and a method in which the properties of the solvent used and the surface roughness are set within the predetermined ranges (JP-A-2000-338310);
  a method of using a binder resin and a plurality of particles and setting the difference in refractive index between the resin and the particles to 0.03-0.2 (JP-A-2000-180611);
  a method of setting a surface haze to 3 or more and setting the difference between a haze value in the normal direction and a haze value in the direction at ±60° to 4 or less with the object of reducing the variations in hue and the decrease in contrast occurring when the viewing angle changes (JP-A-11-160505).

Thus, antiglare films of various configurations created to attain a variety of purposes have been disclosed.

The properties of antiglare films used for the front surface of displays vary depending on the display type. In other words, the optimum antiglare film depends on the display resolution or purpose of use. Therefore, a large number of different types of antiglare film are required according to the application of the display.

Recently, antiglare films which are free from non-uniformity such as uneven appearance tend to be desired. Especially as many large type displays have been developed, this tendency has become more significant. In the antiglare film of the present invention, it is preferred that (1) there is no in-plane non-uniformity such as uneven appearance; (2) an image of an external light which reflects on the surface of the antiglare layer's side becomes smudgy due to excellent antiglare properties; (3) a "white-blurring" phenomenon hardly occurs even when illumination such as from a fluorescent lamp falls on the surface of the antiglare layer's side; and (4) the surface of the antiglare layer's side has a high Abrasion resistance. It is an object of the present invention to provide an antiglare film which satisfies all of the properties (1)-(4) stated above.

SUMMARY OF THE INVENTION

According to one aspect of the present invention, there is provided an antiglare film including an antiglare layer which has in the binder matrix thereof dispersed particles A and dispersed particles B, wherein the difference in density between the particles A and the particles B is 0.2 g/cm$^3$ or less; the value ($R_A$/H), namely the quotient of the division of an average diameter of the particles A ($R_A$) by an average thickness of the antiglare layer (H), is in the 0.40-0.80 range; the value ($R_B/R_A$), namely the quotient of the division of an average diameter of the particles B ($R_B$) by the average diameter of the particles A ($R_A$), is in the 0.20-0.60 range; the value (($w_A+w_B)/w_M$), namely the quotient of the division of a sum of a content of the particles A ($w_A$) and a content of the particles B ($w_B$) in the antiglare layer by a content of the binder matrix ($w_M$) in the antiglare layer, is in the 0.10-0.40 range; and the value ($w_B/w_A$), namely the quotient of the division of the content of the particles B ($w_B$) by the content of the particles A ($w_A$) is in the 0.50-1.50 range.

According to another aspect of the present invention, there is provided a transmissive liquid crystal display including the antiglare film of the present invention, a polarizing plate, a liquid crystal cell, a polarizing plate, and a backlight unit, in the order of description from an observer side.

DETAILED DESCRIPTION OF THE INVENTION

Figure 1:
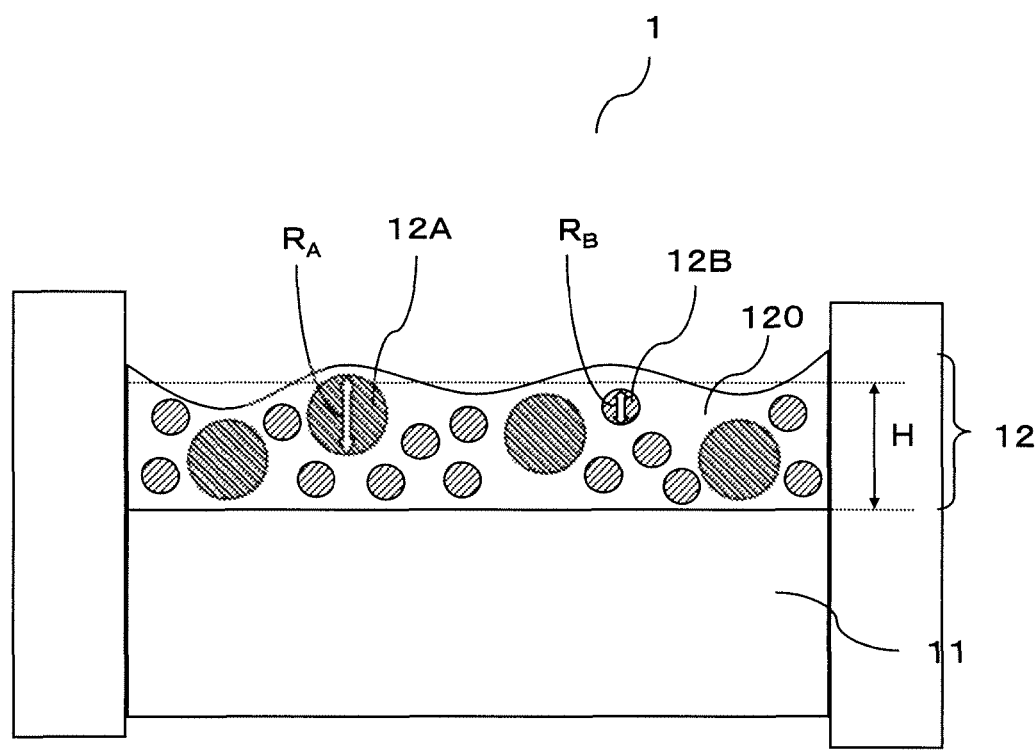
FIG. 1 is a cross-sectional schematic view of the antiglare film in accordance with the present invention.

FIG. 1 is a cross-sectional schematic view of the antiglare film in accordance with the present invention. An antiglare film (1) in accordance with the present invention has an antiglare layer (12) on a transparent substrate (11). The antiglare layer of the antiglare film of the present invention includes a binder matrix (120), particles A (12A) and particles B (12B), which have an average diameter less than that of the particles A (12A).

In the antiglare film in accordance with the present invention, (a) the difference in density between the particles A and particles B is 0.2 g/cm³ or less, (b) the value ($R_A/H$), namely the quotient of the division of an average diameter of the particles A ($R_A$) by an average thickness of the antiglare layer (H), is in the 0.40-0.80 range, (c) the value ($R_B/R_A$), namely the quotient of the division of the average diameter of the particles B ($R_B$) by the average diameter of the particles A ($R_A$), is in the 0.20-0.60 range, (d) the value (($w_A+w_B$)/$w_M$), namely the quotient of the division of a sum of a content of the particles A ($w_A$) and a content of the particles B ($w_B$) in the antiglare layer by a content of the binder matrix ($w_M$) in the antiglare layer, is in the 0.10-0.40 range, and (e) the value ($w_B/w_A$), namely the quotient of the division of the content of the particles B ($w_B$) by the content of the particles A ($w_A$) is in the 0.50-1.50 range.

It is a feature of the present invention that (a) the difference in density between the particles A and particles B is 0.2 g/cm³ or less. If the difference in density between the particles A and particles B exceeds 0.2 g/cm³, uneven appearance tends to be seen. This phenomenon occurs for the following reasons.

In accordance with the present invention, the antiglare layer is produced on a transparent substrate through a coating process, in which an antiglare layer forming solution which contains a binder matrix material, particles A, particles B and their solvent should be coated and a raw layer is formed on the transparent substrate; a drying process, in which the raw layer is dried; and an ionizing radiation exposing process, in which the coated raw layer is exposed to an ionizing irradiation. Although the solvent is supposed to be removed in the drying process, ahead of this, the solvent starts to moderately evaporate as soon as the antiglare layer forming solution is coated. Hence it is quite difficult to control a removal of the solvent so that a uniform layer is formed all over the surface.

While the solvent is abundant in the coating film after coating, it is observed that particles float to the top or settle down at the bottom in the coating solution depending on their specific gravity (or the particle's density) since they can move quite easily. There are two or more kinds of particles, and each distribution state thereof differs in accordance with the solvent's removal rate which varies in-plane in the coating solution if there is a major difference in density among the particles. In other words, in the case where there is a difference of more than 0.2 g/cm³ in density between the particles A and particles B for example, while both of the particles A and particles B are evenly dispersed in an area where the solvent's removal rate is high, the particles A and particles B are unevenly distributed in an area where the solvent's removal rate is low. As a result, differences in concave-convex structure, which is formed on the surface of the antiglare layer depending on each of the particles, are produced within the same antiglare layer. Then, due to these differences, in-plane non-uniformity is perceived in appearance.

The inventors have discovered the mechanism whereby the non-uniform appearance described above occurs and succeeded in forming an antiglare film free from non-uniform appearance by making the difference in density between the particles A and particles B be 0.2 g/cm³ or less even if two or more kinds of particles are used.

The particle density of the present invention can be obtained by means of a Le chatelier pycnometer in conformity with JIS (Japanese Industrial Standards) K0061.

In the present invention, by using the particle A, which satisfies (b), (c), (d) and (e) noted below, and the particle B, which is sufficiently smaller than the particle A, the particle B is arranged between any two adjacent particles A. As a result, the particles A are prevented from clumping together and allowed to be dispersed evenly in the antiglare layer so that an antiglare film free from "white-blurring" and having a high level of abrasion resistance is attained.

It is a feature of the present invention that (b) the value ($R_A/H$), i.e. the quotient of the division of an average diameter of the particles A ($R_A$) by an average thickness of the antiglare layer (H), is in the 0.40-0.80 range. If the ($R_A/H$) is less than 0.40, it becomes difficult to form the concave-convex structures on the antiglare layer surface to maintain an antiglare property, and thus it will no longer be possible to sufficiently prevent outside light reflecting on the surface. On the other hand, if the ($R_A/H$) exceeds 0.80, since large convex patterns are created on the surface of the antiglare layer and the concave-convex property becomes excessive, the "white-blurring" phenomenon will occur. In addition, abrasion resistance will be weakened because large convex patterns are easily damaged when the antiglare film surface is rubbed.

In accordance with the present invention, the average thickness of the antiglare layer (H) means an average value in thickness of the antiglare layer including the concave-convex surface. The average thickness can be measured with an electronic micrometer or an automated microgeometry measuring instrument. Moreover, the average diameter of the particles A which is used in this invention can be measured with a light scattering particle size distribution analyzer.

In addition, it is a feature of the present invention that (c) the value ($R_B/R_A$), namely the quotient of the division of the average diameter of the particles B ($R_B$) by the average diameter of the particles A ($R_A$), is in the 0.20-0.60 range. If the value ($R_B/R_A$) exceeds 0.60, the concave-convex structure created by the particles A and particles B becomes excessive and thus causes an occurrence of the "white-blurring" phenomenon as well as a weakening in the abrasion resistance. In contrast, if the ($R_B/R_A$) is less than 0.20, the particles A and particles B are combined and clump together so that an excessive concave-convex structure will be formed on the surface of the antiglare film. In other words, it will be difficult for the particles B to slip between the particles A in order to prevent them from forming clumps and the concave-convex property becomes excessive. Hence, the "white-blurring" phenomenon occurs and the surface abrasion resistance becomes low. The average diameter of the particles B which is used in this invention can be measured with a light scattering particle size distribution analyzer similar to that of the particle A.

Moreover, it is a feature of the present invention that (d) the value (($w_A + w_B)/w_M$), namely the quotient of the division of a sum of a content of the particles A ($w_A$) and a content of the particles B ($w_B$) in the antiglare layer by a content of the binder matrix ($w_M$) in the antiglare layer, is in the 0.10-0.40 range. If the (($w_A + w_B)/w_M$) is more than 0.40, the concave-convex structure created by the particles A and particles B becomes excessive and thus causes an occurrence of the "white-blurring" phenomenon as well as a weakening of the abrasion resistance. If the (($w_A + w_B)/w_M$) is less than 0.10, it will be difficult to form the concave-convex structure on the surface of the antiglare layer, and thus the antiglare property becomes weak and it is no longer possible to sufficiently prevent the outside light reflecting on the surface. In accordance with the present invention, the content of the binder matrix in the antiglare layer is obtained from a subtraction of the weight of the particles A and particles B from the weight of the antiglare layer.

Furthermore, it is a feature of the present invention that (e) the value ($w_B/w_A$), namely the quotient of the division of the content of the particles B ($w_B$) by the content of the particles A ($w_A$) is in the 0.50-1.50 range. If the ($w_B/w_A$) is less than 0.50, the probability of there being a particle B in a space between adjacent particles A becomes too low to evenly diffuse particles A in the antiglare layer. Then, the concave-convex structure created by the particles A and particles B becomes excessive so that it causes an occurrence of the "white-blurring" phenomenon as well as a weakening of the abrasion resistance of the surface. If the ($w_B/w_A$) is more than 1.50, indeed the particles A are prevented from clumping, but the particles B will make clumps instead. Thus the concave-convex structure created by particles A and particles B becomes excessive resulting in an occurrence of "white-blurring" and a weakening of the surface's abrasion resistance.

A better antiglare property can be obtained in the antiglare film which has on the surface thereof a concave-convex structure by making the convexes formed on the surface larger and blurring an image derived from external light. In case where there is an excessive concave-convex structure, however, the "white-blurring" phenomenon occurs when illumination such as from a fluorescent lamp falls on the surface. This phenomenon occurs since illumination light such as from a fluorescent lamp falling on the surface of the antiglare layer is excessively scattered by the excessive concave-convex structure formed on the surface of the antiglare layer.

In addition, in the antiglare film having on the antiglare layer's surface thereof an excessive concave-convex structure, the convexes of the antiglare layer can easily be damaged or destroyed when its surface happens to be rubbed. Hence, abrasions produced when rubbed tend to be observed and the abrasion resistance of the antiglare film becomes low.

In the antiglare film having on the antiglare layer's surface thereof the concave-convex structure which is formed by diffusing the particles in the binder matrix, the larger the average diameter of the particle, the larger the convexes which are formed on the surface of the antiglare layer become. On the other hand, even when the particles with small average diameter are used, excessive concave-convex structure can still be created on the antiglare film's surface if the particles are dispersed unevenly or clump together.

The Inventors found that an antiglare film free from "white-blurring" and also having a high abrasion resistance can be obtained by forming an antiglare layer with the particles A and the particles B, which has a sufficiently smaller average diameter than those of particles A, and thereby inserting the particles B between adjacent particles A so that the particles A are dispersed evenly in the antiglare layer. In addition, the inventors have succeeded in making the degree of the in-plane dispersion of the particles A and particles B uniform by adjusting the difference in density between the particles A and particles B.

Therefore in accordance with the present invention, as is noted in (a), the particles A and particles B which have a difference in density of 0.2 g/cm$^3$ or less are used. In addition, as is noted in (b), the particles A which have an average diameter of the size obtained by multiplication of the antiglare layer's average thickness H and a certain value in the 0.40-0.80 range are used. Moreover, as is noted in (c), the particles B which have an average diameter of the size obtained by multiplication of the average diameter of the particles A $R_A$ and a certain value in the 0.20-0.60 range are used. As is noted in (d), the combined content of the particles A and particles B in the antiglare layer is a quantity of the multiplication of the content of the binder matrix in the antiglare layer and a certain value in the 0.10-0.40 range. Furthermore, as is noted in (e), the content of the particles B is a quantity of the multiplication of the content of the particles A and a certain value in the 0.50-1.50 range. It becomes possible to produce an antiglare film which (1) is even in plane, (2) has excellent antiglare properties, (3) is free from "white-blurring" and also (4) has a high abrasion resistance by making the antiglare layer to satisfy all of the conditions (a), (b), (c), (d) and (e) since the particles B slip into any space between two adjacent particles A so that the particles A and particles B are dispersed evenly in the antiglare layer.

In addition, it is preferable that the antiglare layer of the antiglare film of this invention has an average thickness (H) in the 3-30 µm range. If the average thickness of the antiglare layer is less than 3 µm, the antiglare film may lose a sufficient hardness and thus it cannot be arranged on the surface of a display device. On the other hand, if the average thickness of the antiglare layer exceeds 30 µm, costs will be too high and/or the resulting antiglare film is sometimes not suitable for a fabrication process for setting on a display surface because it bends too much. The preferable thickness of the antiglare layer is in the 4-20 µm range.

If necessary, a functional layer which has properties such as antireflection, antistatic, antifouling, electromagnetic shielding, infrared absorption, ultraviolet-ray absorption and color compensation etc. is arranged on the antiglare film of the present invention. Examples of the functional layer are antireflection layer, antistatic layer, antifouling layer, electromagnetic shielding layer, infrared absorption layer, ultraviolet-ray absorption layer and color compensation layer etc. The functional layer may have a single layer structure or a multilayer structure. The functional layer may have a single layer structure with a plurality of functions such as antifouling antireflection properties. The functional layers may be arranged on the antiglare layer, or between the transparent substrate and the antiglare layer. In order to improve adhesiveness, a primer layer or an adhesive layer etc. can be placed between each layer.

Figure 2:
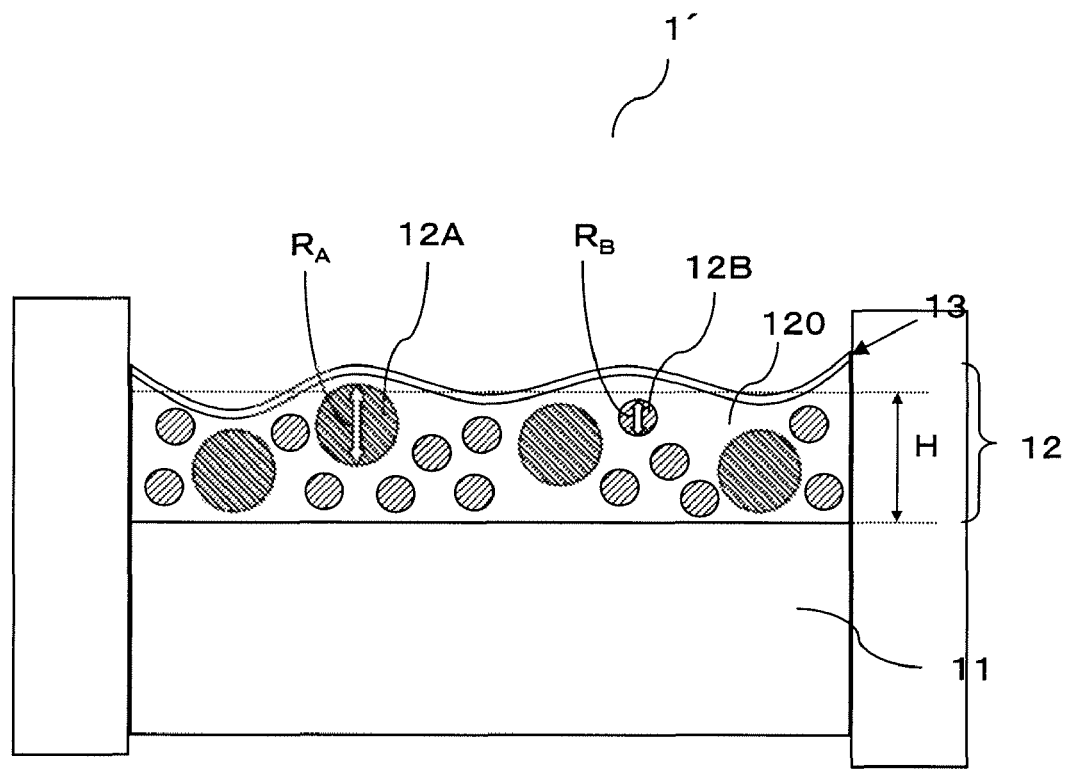
FIG. 2 is a cross-sectional schematic view of an antiglare film of another embodiment of the present invention.

FIG. 2 illustrates a cross-sectional schematic view of the antiglare film in accordance with another embodiment of the present invention. The antiglare film (1') of this embodiment of the present invention is arranged with an antiglare layer (12) on a transparent substrate (11), and a functional layer (13) on the antiglare layer (12). Either an antistatic layer, an antireflection layer or an antifouling layer is selectively arranged as the functional layer. It is preferable that the antireflection layer is arranged among them. The antireflection layer on the antiglare layer reduces a reflection derived from an external light falling on the surface of the antiglare film. The antireflection layer on the antiglare layer not only scatters the external light falling on the antiglare film but also prevents the external light from reflecting an image by the effect of interference of light.

The examples of the functional layer arranged on the antiglare layer are an antistatic layer, an antireflection layer or an antifouling layer etc. which has a single layer or a multilayer structure. The functional layer may also be a single layer with a plurality of functions such as an antifouling antireflection layer. The antireflection layer may consist of a single low refraction layer or a multilayer with an iteration structure of a low refractive index layer and a high refractive index layer.

Figure 3A:
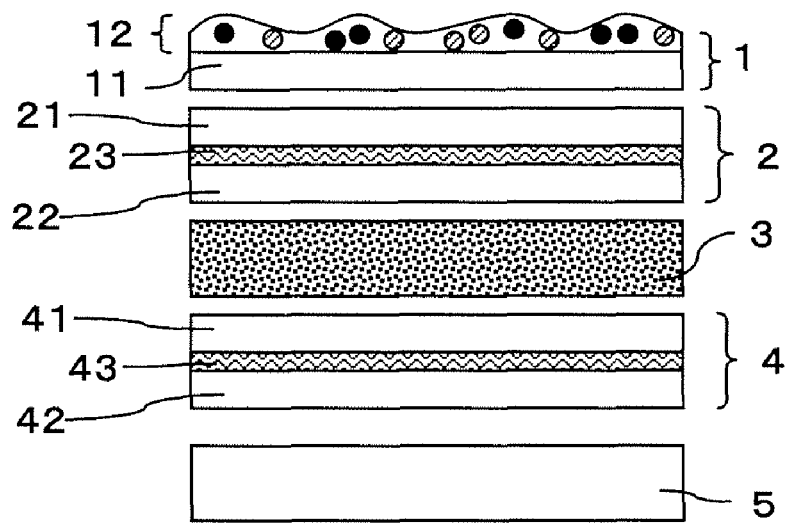
FIGS. 3A and 3B show a transmission-type liquid crystal display using the antiglare film in accordance with the present invention.
Figure 3B:
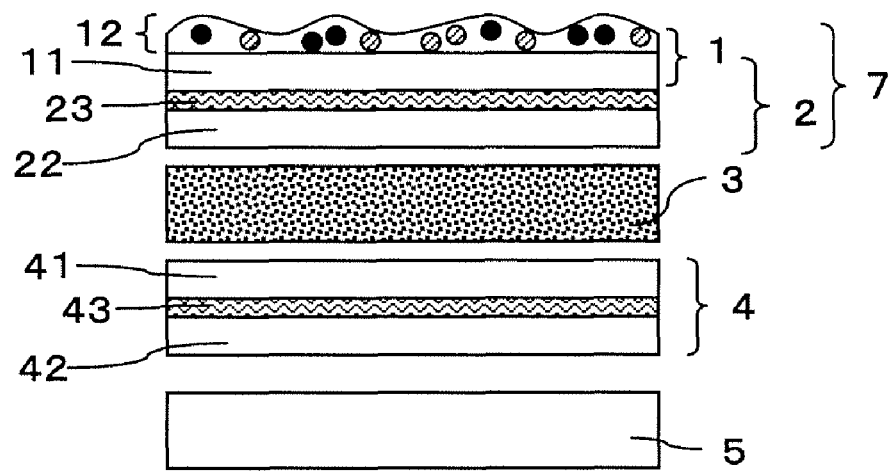

FIGS. 3A and 3B show a transmission-type liquid crystal display using the antiglare film in accordance with the present invention. In the transmission-type liquid crystal display shown in FIG. 3A, a backlight unit (5), a polarizing plate (4), a liquid crystal cell (3), a polarizing plate (2) and an antiglare film (1) are provided in the order of description. In this case, the side of the antiglare film (1) is the observation side, that is, the display surface.

The backlight unit (5) includes a light source and a light diffusion plate. The liquid crystal cell has a structure in which an electrode is provided on one transparent substrate, an electrode and a color filter are provided on the other transparent substrate, and a liquid crystal is sealed between the two electrodes. The polarizing plates are provided so as to sandwich the liquid crystal cell (3). In this structure, polarizing layers (23, 43) are sandwiched between the transparent substrates (21, 22, 41, 42).

FIG. 3A shows a transmission-type liquid crystal display in which the transparent substrate (11) of the antiglare film (1) is provided separately from the transparent substrate of the polarizing plate (2). On the other hand, FIG. 3B shows a structure in which the polarizing layer (23) is provided on the surface of the transparent substrate (11) of the antiglare film (1) that is on the side opposite the antiglare layer, and the transparent substrate (11) serves as a transparent substrate of the antiglare film (1) and the transparent substrate of the polarizing plate (2).

Further, the transmission-type liquid crystal display in accordance with the present invention may include other functional elements. Examples of other functional elements include a diffusion film, a prism sheet, a luminance-increasing film for effectively using the light emitted from the backlight, and also a phase difference film for compensating the phase difference of the polarizing plate or liquid crystal cell, but the transmission-type liquid crystal display in accordance with the present invention is not limited to these elements.

A method for manufacturing the antiglare film in accordance with the present invention will be described below.

With the method for manufacturing the antiglare film in accordance with the present invention, an antiglare layer can be formed on the transparent substrate by a process including a step of coating on a transparent substrate a coating liquid for forming an antiglare film that contains at least a binder matrix forming material that is cured by ionizing radiation, particles A, particles B, and a solvent and forming a coating film on the transparent substrate and a step of curing the binder matrix forming material by ionizing radiation.

Glass or a plastic film can be used as the transparent substrate employed in accordance with the present invention. The plastic film may have appropriate transparency and mechanical strength. For example, a film of polyethylene terephthalate (PET), triacetyl cellulose (TAC), diacetyl cellulose, acetyl cellulose butyrate, polyethylene naphthalate (PEN), a cycloolefin polymer, a polyamide, a polyethersulfone (PES), polymethyl methacrylate (PMMA), and a polycarbonate (PC) can be used. Among them, a triacetyl cellulose film can be used advantageously because of small birefringence and good transparency thereof. In particular, when the antiglare film in accordance with the present invention is provided on a liquid crystal display surface, triacetyl cellulose is especially preferred as the transparent substrate.

Further, as shown in FIG. 3B, a polarizing layer can be also provided on the surface of the transparent substrate located on the opposite side from the surface where the antiglare layer is located. In this case, for example, a stretched film of polyvinyl alcohol (PVA) having iodine added thereto can be used as the polarizing layer. The polarizing layer in this case is sandwiched by the transparent substrates.

The liquid for forming the antiglare layer contains at least a binder matrix forming material that is cured by ionizing radiation, particles A, particles B, and a solvent. In this case, a material curable by ionizing radiation can be used as the binder matrix forming material. Examples of materials that can be used as materials curable by ionizing radiation include polyfunctional acrylates such as acrylic acid or methacrylic acid esters of polyhydric alcohols, and polyfunctional urethane acrylates synthesized from diisocyanates, polyhydric alcohols, and hydroxy esters of acrylic acid or methacrylic acid. In addition, polyether resins, polyester resins, epoxy resins, alkyd resins, spyroacetal resins, polybutadiene resins, and polythiolpolyene resins having an acrylate functional group can be used as the materials curable by ionizing radiation.

Among them, trifunctional acrylate monomers and tetrafunctional acrylate monomers that are materials curable by ionizing radiation are preferred as the binder matrix forming materials. By using trifunctional acrylate monomers and tetrafunctional acrylate monomers, it is possible to obtain an antiglare film comprising sufficient abrasion resistance. Specific examples of trifunctional acrylate monomers and tetrafunctional acrylate monomers include trifunctional and tetrafunctional compounds from among polyfunctional acrylate monomers such as acrylic acid or methacrylic acid esters of polyhydric alcohols or polyfunctional urethane acrylate monomers synthesized from diisocyanates, polyhydric alcohols, and hydroxy esters of acrylic acid or methacrylic acid. In this case, the trifunctional acrylate monomers and tetrafunctional acrylate monomers are preferably used in a total amount equal to or larger than 80 wt. % based on the binder matrix forming material.

Further, in the binder matrix forming material, a thermoplastic resin can be also added to the material curable by ionizing radiation. Examples of suitable thermoplastic resins include cellulose derivatives such as acetyl cellulose, nitrocellulose, acetylbutyl cellulose, ethyl cellulose, and methyl cellulose, vinyl resins such as vinyl acetate and copolymers thereof, vinyl chloride and copolymers thereof, and vinylidene chloride and copolymers thereof, acetal resins such as polyvinyl formal and polyvinyl butyral, acrylic resins such as acrylic resin and copolymers thereof and methacrylic resin and copolymers thereof, polystyrene resin, polyamide resins, linear polyester resins, and polycarbonate resins. By adding a thermoplastic resin, it is possible to improve adhesiveness of the transparent substrate and antiglare layer. Further, by adding a thermoplastic resin, it is possible to inhibit the curling of the produced antiglare film.

Particles A and particles B used in accordance with the present invention can be appropriately selected from polymethyl methacrylate (PMMA) particles (density 1.2 g/cm$^3$), polystyrene particles (density 1.1 g/cm$^3$), styrene/PMMA copolymer particles (density 1.1-1.2 g/cm$^3$), polycarbonate particles (density 1.2 g/cm$^3$), polyurethane particles (density 1.2 g/cm$^3$), Nylon particles (density 1.1 g/cm$^3$), polyethylene particles (density 0.9 g/cm$^3$), polypropylene particles (density 0.9 g/cm$^3$), silicone particles (density 0.8 g/cm$^3$), polytetrafluoroethylene particles (density 2.2 g/cm$^3$), polyvinylidene fluoride particles (density 1.7 g/cm$^3$), polyvinylidene chloride particles (density 1.9 g/cm$^3$), silicon oxide particles (density 2.2 g/cm$^3$), titanium oxide particles (density 4.2 g/cm$^3$), alumina particles (density 4.0 g/cm$^3$), and zinc oxide particles (density 5.6 g/cm$^3$). In accordance with the present invention, particles A and particles B may be from the same material.

When ultraviolet radiation is used as the ionizing radiation, a photopolymerization initiator is added to the coating liquid for forming an antiglare layer. Well known photopolymerization initiators can be used for this purpose, but it is preferred that the photopolymerization initiator contained in the binder matrix forming material be used. Examples of suitable photopolymerization initiators include benzoin and alkyl ethers thereof such as benzoin, benzoin methyl ether, benzoin ethyl ether, benzoin isopropyl ether, and benzyl methyl ketal. The amount of photopolymerization initiator used is 0.5-20 wt. %, preferably 1-5 wt. % based on the binder matrix forming material.

A solvent is added to the coating liquid for forming an antiglare layer. By adding a solvent, it is possible to uniformly disperse the particles and binder matrix and also adjust the viscosity of the coating liquid to an adequate range when the coating liquid is coated on the transparent substrate.

In accordance with the present invention, when triacetyl cellulose is used as the transparent substrate and the antiglare layer is directly provided, without other functional layers, on the triacetyl cellulose film, it is preferred that a mixed solvent be used that includes a solvent that dissolves the triacetyl cellulose film or causes swelling thereof and a solvent that neither dissolves the triacetyl cellulose film nor causes swelling thereof. By using the mixed solvent, it is possible to obtain an antiglare film having sufficient adhesion on the interface of the triacetyl cellulose and antiglare layer.

In this case, examples of solvents that dissolve a triacetyl cellulose film or cause swelling thereof include ethers such as dibutyl ether, dimethoxymethane, dimethoxyethane, diethoxyethane, propylene oxide, dioxane, dioxalan, trioxane, tetrahydrofuran, anisole, and phenetol, partial ketones such as acetone, methyl ethyl ketone, diethyl ketone, dipropyl ketone, diisobutyl ketone, cyclopentanone, cyclohexanone, methyl cyclohexanone, and methyl cyclohexanone, esters such as ethyl formate, propyl formate, n-pentyl formate, methyl acetate, ethyl acetate, methyl propionate, ethyl propionate, n-pentyl acetate, and γ-butyrolactone, and cellosolves such as methyl cellosolve, cellosolve, butyl cellosolve, and cellosolve acetate. These solvents can be used individually or in combinations of two or more thereof.

Examples of solvents that neither dissolve a triacetyl cellulose film nor cause swelling thereof include aromatic hydrocarbons such as toluene, xylene, cyclohexanone, and cyclohexylbenzene, hydrocarbons such as n-hexane, and partial ketones such as methyl isobutyl ketone and methyl butyl ketone. These solvents can be used individually or in combinations of two or more thereof.

In accordance with the present invention, an additive that is called a surface adjusting agent may be added to prevent the occurrence of coating defects such as repelling and unevenness in the antiglare layer (coating film) that is formed by coating the coating liquid for forming an antiglare layer. Depending on the action thereof, the surface adjusting agent is also called a leveling agent, an antifoaming agent, an interface tension adjusting agent, and a surface tension adjusting agent, but all these agents act to decrease the surface tension of the coating film (antiglare layer).

Examples of additives that are usually used as the surface adjusting agent include silicone-based additive, fluorine-containing additive, and acrylic additives. Examples of suitable silicone-based additives include derivatives having polydimethylsiloxane as the basic structure in which a side chain of the polydimethylsiloxane structure is modified. For example, a polyether-modified dimethyl siloxane can be used as the silicone additive. Compounds having a perfluoroalkyl group are used as fluorine-containing additives.

In addition to the above-described surface adjusting agent, other additives may be also added to the coating liquid for forming an antiglare layer in accordance with the present invention. However, it is preferred that these additives produce no adverse effect on the transparency and light diffusing ability of the antiglare layer that is formed. Examples of functional additives include an antistatic agent, an ultraviolet absorbing agent, an infrared absorbing agent, an antifouling agent, a water repellent, a refractive index adjusting agent, an adhesiveness increasing agent, and a curing agent. As a result, functions other than the antiglare function, such as an antistatic function, an ultraviolet absorption function, an infrared absorption function, an antifouling function, and a water repellent function can be imparted to the antiglare layer formed.

The coating liquid for forming an antiglare layer is coated on the transparent substrate to form a coating film.

A coating method using a roll coater, a reverse roll coater, a gravure coater, a knife coater, a bar coater, or a die coater can be used as a method for coating the coating liquid for forming an antiglare layer on the transparent substrate. Among these coaters, a die coater suitable for high-speed coating based on a roll-to-roll system is preferably used. The concentration of solids in the coating liquid differs depending on the coating method. The concentration of solids generally may be 30-70 wt. %.

Figure 4:
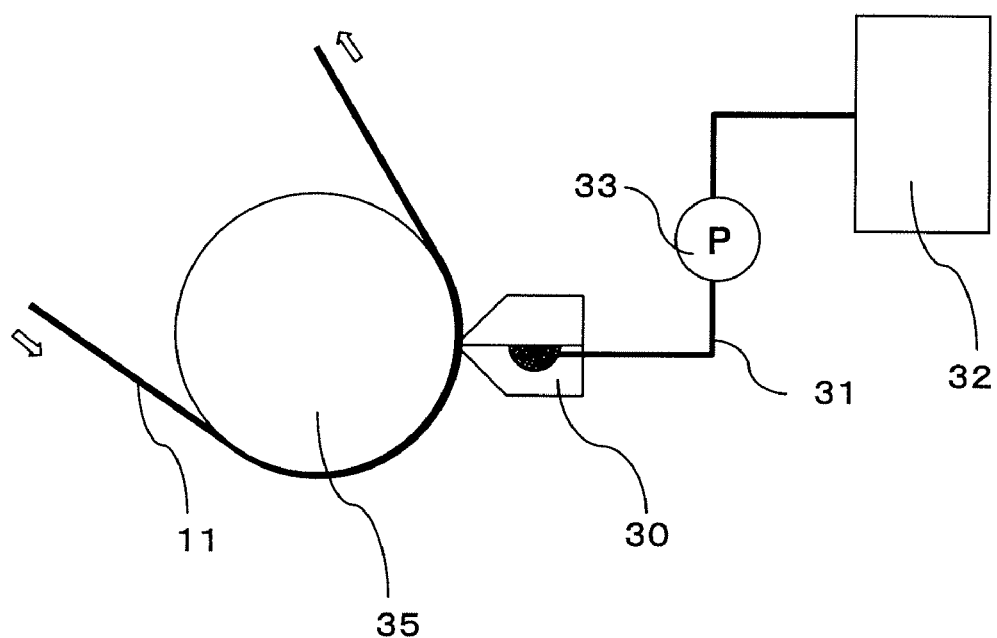
FIG. 4 is a schematic drawing of a coating apparatus using a die coater in accordance with the present invention.

Next, a coating apparatus using a die coater in accordance with the present invention will be described below. FIG. 4 is a schematic drawing of a coating apparatus using a die coater in accordance with the present invention. The apparatus using a die coater in accordance with the present invention has a structure in which a die head 30 is connected by a pipe 31 to a coating liquid tank 32, and the coating liquid for forming an antiglare layer that is located in the coating liquid tank 32 is pumped by a liquid pump 33 into the die head 30. The coating liquid that has been pumped into the die head 30 is ejected from a slit gap, and a coating film is formed on a transparent substrate 11. By using a wound transparent substrate 11 and a rotary roller 35, it is possible to form a coating film continuously on the transparent substrate by a roll-to-roll system.

After a step of forming the coating film, a drying process to remove the solvent which remains in the coating film is implemented. Examples of suitable drying means include heating, air blowing, and hot air blowing. In addition, it may also be possible to remove the solvent by drying naturally.

An antiglare layer is formed by irradiating the coating film obtained by coating the coating liquid for forming an antiglare layer on the transparent substrate with ionizing radiation. Ultraviolet radiation or electron beam can be used as the ionizing radiation. When ultraviolet curing is employed, a light source such as a high-pressure mercury lamp, a low-pressure mercury lamp, an ultrahigh-pressure mercury lamp, a metal halide lamp, a carbon arc, or a xenon arc can be used. Further, in the case of electron beam curing, an electron beam emitted from various electron beam accelerators such as a Cockroft-Walton accelerator, a Van de Graaff accelerator, a resonance transformer-type accelerator, an insulating core transformer-type accelerator, a linear accelerator, a dynamitron accelerator, or a high-frequency accelerator can be used. The electron beam preferably has an energy of 50-1000 KeV. An electron beam having an energy of 100-300 KeV is more preferred.

In accordance with the present invention, the antiglare layer is formed on the transparent substrate through a coating process, namely a step of coating the coating liquid for forming an antiglare layer on the transparent substrate; a drying process, namely a step of drying the coating film on the transparent substrate; and irradiating process, namely a step of irradiating an ionizing radiation ray on the transparent substrate. The producing method of the antiglare film of the present invention can also include other manufacturing processes.

In addition, in accordance with the present invention, it is possible to increase the quantity of the solvent in the coating liquid for forming an antiglare layer so that the ratio of the solid content decreases. If the ratio of the solid content is small, it takes a considerable time to remove the solvent contained in the coating film formed on the transparent substrate. In the present invention, however, unevenness, which is caused by a difference in density between the particles A and the particles B, does not occur significantly even when it takes a considerable time from the coating process to the drying process. As a result, the particles which are dispersed in the coating liquid for forming an antiglare layer can be maintained in a good state by making the ratio of the solid content small. If the ratio of the solid content is large, the particles tend to aggregate. As used herein, the ratio of the solid content means the quotient of the division of the difference between the quantity of the coating liquid for forming an antiglare layer and the quantity of the solvent contained therein by the quantity of the coating liquid for forming an antiglare layer.

The antiglare film in accordance with the present invention is manufactured in the above-described manner.

A method for forming an antireflection layer in the antiglare film by which the antireflection layer such as shown in FIG. 2 is provided as a functional layer on the antiglare layer will be described below. The antireflection layer can have a monolayer structure composed of a single layer with a low refractive index or a multilayer structure composed of a repetitive structure of layers with a low refractive index and layers with a high refractive index. Methods for forming an antireflection layer can be classified into methods based on a wet film forming process in which a coating liquid for forming an antireflection layer is coated on the antiglare layer surface and methods by which the coating film is formed under vacuum, such as a vacuum vapor deposition method, a sputtering method, and a CVD method.

A method by which a single layer with a low refractive index is formed as an antireflection layer by a wet film forming method by coating a coating liquid for forming an antireflection layer on the antiglare layer surface will be described below. In this case, the thickness (d) of a single layer with a low refractive index that is the antireflection layer is designed such that an optical film thickness (nd) obtained by multiplying the film thickness (d) by a refractive index (n) of the layer with a low refractive index be equal to ¼ the visible light wavelength. A layer obtained by dispersing low-refractive particles in a binder matrix can be used as the layer with a low refractive index.

At this point, examples of suitable particles with a low refractive index include particles composed of a low-refractive material such as magnesium fluoride, calcium fluoride, and silica. On the other hand, polyfunctional acrylates such as acrylic acid or methacrylic acid esters of polyhydric alcohols or polyfunctional urethane acrylates such as obtained by synthesis from diisocyanates, polyhydric alcohols, and acrylic acid or methacrylic acid hydroxy esters that are materials curable by ionizing radiation can be used as the binder matrix forming materials. In addition, polyether resins, polyester resins, epoxy resins, alkyd resins, spyroacetal resins, polybutadiene resins, and polythiolpolyene resins having acrylate functional groups can be used as the materials curable by ionizing radiation. When such materials curable by ionizing radiation are used, the binder matrix is formed by irradiation with ionizing radiation such as ultraviolet radiation or electron beam. Metal alkoxides, for example, silicon alkoxides such as tetramethoxysilane or tetraethoxysilane can be used as the binder matrix forming materials. In this case, inorganic or organic-inorganic composite binder matrix can be obtained by hydrolysis or dehydration condensation.

A layer with a low refractive index can be obtained not only by dispersing particles having a low refractive index in a binder matrix, but also from a fluorine-containing organic material having a low refractive index, without using the low-refractive particles.

Such a coating liquid for forming a layer with a low refractive index that contains the material having a low refractive index and the binder matrix forming material is coated on the antiglare layer surface. In this case, a solvent or a variety of additives can be added, as necessary, to the coating liquid for forming a layer with a low refractive index. The solvent can be appropriately selected with consideration of the suitability for coating from among aromatic hydrocarbons such as toluene, xylene, cyclohexanone, and cyclohexylbenzene, hydrocarbons such as n-hexane, ethers such as dibutyl ether, dimethoxymethane, dimethoxyethane, diethoxyethane, propylene oxide, dioxane, dioxalan, trioxane, tetrahydrofuran, anisole, and phenetol, ketones such as methyl isobutyl ketone, methyl butyl ketone, acetone, methyl ethyl ketone, diethyl ketone, dipropyl ketone, diisobutyl ketone, cyclopentanone, cyclohexanone, methyl cyclohexanone, and methyl cyclohexanone, esters such as ethyl formate, propyl formate, n-pentyl formate, methyl acetate, ethyl acetate, methyl propionate, ethyl propionate, n-pentyl acetate, and γ-butyrolactone, cellosolves such as methyl cellosolve, cellosolve, butyl cellosolve, and cellosolve acetate, alcohols such as methanol, ethanol, and isopropyl alcohol, and water. Examples of other suitable additives include surface adjusting agents, antistatic agents, antifouling agents, water repellents, refractive index adjusting agents, adhesion improving agents, and curing agents.

A coating method using a roll coater, a reverse roll coater, a gravure coater, a knife coater, a bar coater, or a die coater can be used for coating.

When the material curable by ionizing radiation is used as the binder matrix forming material for the coating film obtained by coating the coating liquid on the transparent substrate, a layer with an antireflection layer can be formed, if necessary, by irradiation with ionizing radiation after the coating film has been dried. Further, when a metal alkoxide is used as the binder matrix forming material, an antireflection layer is formed by drying and heating. If a metal alkoxide is used as the binder matrix forming material, it is preferred that the antiglare film receive an alkali treatment before the antireflection layer is formed. The alkali treatment can serve to improve the adhesiveness between the antiglare layer and the antireflection layer.

The antireflection layer can have a stacked layer structure with an iteration structure of a low refractive index layer and a high refractive index layer. For example, the antireflection layer can take a four-layer structure in which a titanium oxide as a high refractive index layer, a silicon oxide as a low refractive index layer, another titanium oxide as a high refractive index layer, and another silicon oxide as a low refractive index layer are deposited in sequence from the antiglare layer side.

In addition, in the case where an antistatic layer is arranged as a functional layer, a producing method of forming a conductive material such as a metal or a metal oxide etc. by a vacuum deposition, or a producing method of coating a coating liquid in which a conductive material such as a metal or a metal oxide etc. is dispersed with the binder matrix material can be used.

The constitution of the invention described above makes it possible to provide an antiglare film with (1) no unevenness, (2) excellent antiglare property, (3) little white-blurring, and (4) a high level of abrasion resistance.

EXAMPLES

Examples are described below.

Example 1

A triacetyl cellulose film (TD-80U, manufactured by Fuji Photo Film Co., Ltd.) was used as a transparent substrate. The coating liquid for forming an antiglare layer was prepared from pentaerythritol acrylate (94.5 parts in weight), which is an acrylic monomer; Irgacure 184 (5 parts in weight), which is a photopolymerization initiator; BYK 350 (0.5 parts in weight), which is a surface adjusting agent; butyl acetate (30 parts in weight) and ethyl acetate (150 parts in weight), which are used herein as a solvent; and particles designated in Table 1 as particles A and particles B. This coating liquid was coated and a coating film was formed on the triacetyl cellulose film by using a coating device employing a die coater in a way that the resulting antiglare layer would have an average thickness of 12 μm after it was dried and cured. The coating film was dried to remove the solvent contained therein. Then, ultraviolet irradiation at 400 mJ/cm$^2$ under an atmosphere with an oxygen concentration equal to or smaller than 0.03% was performed to cure the coating film using a high-pressure mercury lamp, and an antiglare film with an antiglare layer was fabricated.

At this point, the average thickness of the antiglare layer was measured with an electronic micrometer (K351C, manufactured by Anritsu Corp.). The average particle sizes of the particles A and particles B ($R_A$, $R_B$, respectively) were measured using a particle size distribution measurement device of a light scattering type (SALD-7000, manufactured by Shimadzu Corporation). Furthermore, the densities of the particles A and particles B were measured in conformity with JIS K0061 using a Le chatelier pycnometer.

Example 2-13, Comparative Example 1-10

Example 1 to Example 13 and Comparative Example 1 to Comparative Example 10 were performed in the same manner as in Example 1 except that particles A and particles B of Example 1 were replaced with particles A and particles B of each Example or Comparative Example shown in Table 1. The antiglare layers were formed on the triacetyl cellulose film in a way that their average thickness became 12 μm.

TABLE 1

| Examples or Comparative Examples | Particles | Material | Average Diameter (μm) | | Parts by Weight | Density (g/cm$^3$) |
|---|---|---|---|---|---|---|
| Example 1 | Particles A | PMMA | $R_A$ | 7.8 | 10 | 1.2 |
| | Particles B | PMMA | $R_B$ | 3.2 | 10 | 1.2 |
| Example 2 | Particles A | Polyvinylidene-fluoride | $R_A$ | 8.0 | 10 | 1.9 |
| | Particles B | Polyvinylidene-fluoride | $R_B$ | 3.5 | 10 | 1.9 |
| Example 3 | Particles A | Silicon oxide | $R_A$ | 7.6 | 10 | 2.2 |
| | Particles B | Silicon oxide | $R_B$ | 2.9 | 10 | 2.2 |
| Example 4 | Particles A | Nylon | $R_A$ | 7.7 | 10 | 1.1 |
| | Particles B | Polypropylene | $R_B$ | 3.0 | 10 | 0.9 |
| Example 5 | Particles A | Polystyrene | $R_A$ | 7.7 | 10 | 1.1 |
| | Particles B | Polyethylene | $R_B$ | 3.4 | 10 | 0.9 |
| Comparative Example 1 | Particles A | PMMA | $R_A$ | 7.8 | 10 | 1.2 |
| | Particles B | Polyethylene | $R_B$ | 3.4 | 10 | 0.9 |
| Comparative Example 2 | Particles A | Polystyrene | $R_A$ | 7.7 | 10 | 1.1 |
| | Particles B | Silicone | $R_B$ | 3.3 | 10 | 0.8 |
| Example 6 | Particles A | PMMA | $R_A$ | 9.4 | 9 | 1.2 |
| | Particles B | PMMA | $R_B$ | 3.9 | 9 | 1.2 |
| Comparative Example 3 | Particles A | PMMA | $R_A$ | 10.0 | 8 | 1.2 |
| | Particles B | PMMA | $R_B$ | 4.3 | 8 | 1.2 |
| Example 7 | Particles A | PMMA | $R_A$ | 4.8 | 15 | 1.2 |
| | Particles B | PMMA | $R_B$ | 2.5 | 10 | 1.2 |
| Comparative Example 4 | Particles A | PMMA | $R_A$ | 4.4 | 14 | 1.2 |
| | Particles B | PMMA | $R_B$ | 1.8 | 14 | 1.2 |
| Example 8 | Particles A | PMMA | $R_A$ | 7.8 | 10 | 1.2 |
| | Particles B | PMMA | $R_B$ | 4.6 | 10 | 1.2 |
| Comparative Example 5 | Particles A | PMMA | $R_A$ | 7.8 | 10 | 1.2 |
| | Particles B | PMMA | $R_B$ | 4.8 | 10 | 1.2 |

TABLE 1-continued

| Examples or Comparative Examples | Particles | | | | |
|---|---|---|---|---|---|
| | Material | | Average Diameter (μm) | Parts by Weight | Density (g/cm³) |
| Example 9 | Particles A | PMMA | $R_A$ | 7.8 | 15 | 1.2 |
| | Particles B | PMMA | $R_B$ | 1.6 | 10 | 1.2 |
| Comparative Example 6 | Particles A | PMMA | $R_A$ | 7.8 | 15 | 1.2 |
| | Particles B | PMMA | $R_B$ | 1.4 | 10 | 1.2 |
| Example 10 | Particles A | PMMA | $R_A$ | 7.8 | 20 | 1.2 |
| | Particles B | PMMA | $R_B$ | 3.2 | 20 | 1.2 |
| Comparative Example 7 | Particles A | PMMA | $R_A$ | 7.8 | 22 | 1.2 |
| | Particles B | PMMA | $R_B$ | 3.2 | 20 | 1.2 |
| Example 11 | Particles A | PMMA | $R_A$ | 7.8 | 5 | 1.2 |
| | Particles B | PMMA | $R_B$ | 3.2 | 5 | 1.2 |
| Comparative Example 8 | Particles A | PMMA | $R_A$ | 7.8 | 4 | 1.2 |
| | Particles B | PMMA | $R_B$ | 3.2 | 5 | 1.2 |
| Example 12 | Particles A | PMMA | $R_A$ | 7.8 | 7 | 1.2 |
| | Particles B | PMMA | $R_B$ | 3.2 | 10 | 1.2 |
| Comparative Example 9 | Particles A | PMMA | $R_A$ | 7.8 | 6 | 1.2 |
| | Particles B | PMMA | $R_B$ | 3.2 | 10 | 1.2 |
| Example 13 | Particles A | PMMA | $R_A$ | 7.8 | 12 | 1.2 |
| | Particles B | PMMA | $R_B$ | 3.2 | 6 | 1.2 |
| Comparative Example 10 | Particles A | PMMA | $R_A$ | 7.8 | 12 | 1.2 |
| | Particles B | PMMA | $R_B$ | 3.2 | 5 | 1.2 |

The antiglare films obtained in Example 1 to Example 13 and Comparative Example 1 to Comparative Example 10 were checked whether there was unevenness or not (unevenness evaluation), whether an image caused by external light was clearly observed or not when external light fell on the antiglare films (antiglare property evaluation), whether the "white-blurring" occurred or not when illumination from a fluorescent lamp was reflected on the antiglare films (white-blurring evaluation), and whether abrasions or scratches were produced or not when the surface of the antiglare films was rubbed (abrasion resistance evaluation) by the following methods. The evaluation methods will be described in detail.

<Unevenness>

The antiglare films obtained in Examples and Comparative Examples were observed by transmitted light and reflected light for visual evaluation. When no unevenness was clearly observed, the evaluation result was represented by a circle symbol, and when undesired unevenness was observed, the evaluation result was represented by a cross.

<Antiglare Property>

The antiglare films obtained in Examples and Comparative Examples were pasted onto a black plastic plate with a tackiness (adhesive) agent, and the sharpness of the reflected image of the fluorescent lamp and the like on the antiglare films was visually evaluated. When the fluorescent lamp image was not clearly seen, the evaluation result was represented by a circle symbol, and when a sharp image of the fluorescent lamp was observed, the evaluation result was represented by a cross.

<White-Blurring>

The antiglare films obtained in Examples and Comparative Examples were pasted onto a black plastic plate with a tackiness agent, and light of a fluorescent lamp was reflected on the antiglare films to visually evaluate the degree of light diffusion with the antiglare film. In this case, when the degree of diffusion of the fluorescent lamp light reflected on the antiglare film was small and no white-blurring was felt on the antiglare film, the evaluation result was represented by a circle symbol, and when white-blurring was felt to an impermissibly high degree, the evaluation result was represented by a cross.

<Abrasion Resistance>

The antiglare films obtained in Examples and Comparative Examples were reciprocatingly rubbed ten laps with a steel wool (#0000) under a load of 500 g/cm², and changes in appearance such as abrasions or scratches on the antiglare films were visually evaluated. When no changes in appearance were confirmed, the evaluation result was represented by a circle symbol, and when significant changes in appearance were confirmed, the evaluation result was represented by a cross.

The evaluation results relating to unevenness, antiglare property, white-blurring, and abrasion resistance of the antiglare films obtained in Examples and Comparative Examples are shown in Table 2.

TABLE 2

| | (a) | (b) | (c) | (d) | (e) | Unevenness | Antiglare property | White-blurring | Abrasion resistance |
|---|---|---|---|---|---|---|---|---|---|
| Example 1 | 0.0 | 0.65 | 0.41 | 0.20 | 1.00 | ○ | ○ | ○ | ○ |
| Example 2 | 0.0 | 0.67 | 0.44 | 0.20 | 1.00 | ○ | ○ | ○ | ○ |
| Example 3 | 0.0 | 0.63 | 0.38 | 0.20 | 1.00 | ○ | ○ | ○ | ○ |
| Example 4 | 0.2 | 0.64 | 0.39 | 0.20 | 1.00 | ○ | ○ | ○ | ○ |
| Example 5 | 0.2 | 0.64 | 0.44 | 0.20 | 1.00 | ○ | ○ | ○ | ○ |
| Comparative Example 1 | 0.3 | 0.65 | 0.44 | 0.20 | 1.00 | X | ○ | ○ | ○ |
| Comparative Example 2 | 0.3 | 0.64 | 0.43 | 0.20 | 1.00 | X | ○ | ○ | ○ |

TABLE 2-continued

| | (a) | (b) | (c) | (d) | (e) | Unevenness | Antiglare property | White-blurring | Abrasion resistance |
|---|---|---|---|---|---|---|---|---|---|
| Example 6 | 0.0 | 0.78 | 0.41 | 0.18 | 1.00 | ○ | ○ | ○ | ○ |
| Comparative Example 3 | 0.0 | 0.83 | 0.43 | 0.16 | 1.00 | ○ | ○ | X | X |
| Example 7 | 0.0 | 0.40 | 0.52 | 0.25 | 0.67 | ○ | ○ | ○ | ○ |
| Comparative Example 4 | 0.0 | 0.37 | 0.41 | 0.28 | 1.00 | ○ | X | ○ | ○ |
| Example 8 | 0.0 | 0.65 | 0.59 | 0.20 | 1.00 | ○ | ○ | ○ | ○ |
| Comparative Example 5 | 0.0 | 0.65 | 0.62 | 0.20 | 1.00 | ○ | ○ | X | X |
| Example 9 | 0.0 | 0.65 | 0.21 | 0.25 | 0.67 | ○ | ○ | ○ | ○ |
| Comparative Example 6 | 0.0 | 0.65 | 0.18 | 0.25 | 0.67 | ○ | ○ | X | X |
| Example 10 | 0.0 | 0.65 | 0.41 | 0.40 | 1.00 | ○ | ○ | ○ | ○ |
| Comparative Example 7 | 0.0 | 0.65 | 0.41 | 0.42 | 0.91 | ○ | ○ | X | X |
| Example 11 | 0.0 | 0.65 | 0.41 | 0.10 | 1.00 | ○ | ○ | ○ | ○ |
| Comparative Example 8 | 0.0 | 0.65 | 0.41 | 0.09 | 1.25 | ○ | X | ○ | ○ |
| Example 12 | 0.0 | 0.65 | 0.41 | 0.17 | 1.43 | ○ | ○ | ○ | ○ |
| Comparative Example 9 | 0.0 | 0.65 | 0.41 | 0.16 | 1.67 | ○ | ○ | X | X |
| Example 13 | 0.0 | 0.65 | 0.41 | 0.18 | 0.50 | ○ | ○ | ○ | ○ |
| Comparative Example 10 | 0.0 | 0.65 | 0.41 | 0.17 | 0.42 | ○ | ○ | X | X |

As used in Table 2, each symbol of (a), (b), (c), (d) and (e) represents the following:

(a): Difference in density between the particles A and the particles B (g/cm$^3$).
(b): The quotient value ($R_A$/H), which is obtained by dividing the average diameter of the particles A ($R_A$) by the average thickness of the antiglare layer (H).
(c): The quotient value ($R_B$/$R_A$), which is obtained by dividing the average diameter of the particles B ($R_B$) by the average diameter of the particles A ($R_A$).
(d): The quotient value (($w_A$+$w_B$)/$w_M$), which is obtained by dividing the sum of the content of the particles A and that of particles B in the antiglare layer ($w_A$+$w_B$) by the content of the binder matrix in the antiglare layer ($w_M$).
(e): The quotient value ($w_B$/$w_A$), which is obtained by dividing the content of the particles B in the antiglare layer ($w_B$) by that of the particles A ($w_A$).

Example 14

The antiglare film obtained in Example 1 was immersed in aqueous solution of 1.5N—NaOH which was heated to 50° C. to receive alkali treatment. After being washed with water, the antiglare film was immersed in aqueous solution of 0.5% by weight-H$_2$SO4 to be neutralized, and rinsed with water and dried. A coating liquid for forming a low refractive index layer was prepared by diluting 5 parts in weight of oligomers, which was obtained by hydrolyzing silicon alkoxide such as tetraethoxysilane etc. with 1 mol/L of hydrochloric acid, and 5 parts in weight of silica particles, which had a low refractive index, with 190 parts in weight of isopropanol. The coating liquid for forming a low refractive index layer was coated on the antiglare layer, which had received the alkali treatment mentioned above, by using a coating apparatus employing a die coater in a way that the resulting layer would have an average thickness of 100 nm in the dry state. In this way, an antireflection layer as a functional layer was fabricated on the antiglare layer. The obtained antiglare film had not only no unevenness in plane, a preferable antiglare property, little white-blurring, and a high level of abrasion resistance but also an excellent antireflection property.

What is claimed is:

1. An antiglare film comprising:
    a transparent substrate; and
    an antiglare layer having a binder matrix in which particles A and particles B are dispersed,
    a difference in density between said particles A and said particles B being 0.2 g/cm$^3$ or less,
    a quotient value ($R_A$/H), which is obtained by division of an average diameter of said particles A ($R_A$) by an average thickness of said antiglare layer (H), being in the 0.40-0.80 range,
    a quotient value ($R_B$/$R_A$), which is obtained by division of an average diameter of said particles B ($R_B$) by an average diameter of said particles A ($R_A$), being in the 0.20-0.60 range,
    a quotient value (($w_A$+$w_B$)/$w_M$), which is obtained by dividing the sum ($w_A$+$w_B$) of a content of said particles A in said antiglare layer ($w_A$) and a content of said particles B in said antiglare layer ($w_B$) by a content of said binder matrix in said antiglare layer ($w_M$), being in the 0.10-0.40 range, and
    a quotient value ($w_B$/$w_A$), which is obtained by division of a content of said particles B in said antiglare layer ($w_B$) by a content of said particles A in said antiglare layer ($w_A$), being in the 0.50-1.50 range.

2. The antiglare film according to claim 1 further comprising:
    a functional layer on an opposite side of said antiglare layer from said transparent substrate.

3. A liquid crystal display of transmission-type comprising:
    said antiglare film according to claim 1;
    a first polarizing plate;
    a liquid crystal cell;
    a second polarizing plate; and
    a backlight unit.

4. A liquid crystal display of transmission-type comprising:
    an antiglare film;
    a first polarizing plate;
    a liquid crystal cell;

a second polarizing plate; and
a backlight unit
in the order of description from observation side,
said antiglare film further comprising:
a transparent substrate; and
an antiglare layer having a binder matrix in which particles A and particles B are dispersed, a difference in density between said particles A and said particles B being 0.2 g/cm$^3$ or less, a quotient value ($R_A$/H), which is obtained by division of an average diameter of said particles A ($R_A$) by an average thickness of said antiglare layer (H), being in the 0.40-0.80 range, a quotient value ($R_B$/$R_A$), which is obtained by division of an average diameter of said particles B ($R_B$) by an average diameter of said particles A ($R_A$), being in the 0.20-0.60 range, a quotient value (($w_A$+$w_B$)/$w_M$), which is obtained by dividing the sum ($w_A$+$w_B$) of a content of said particles A in said antiglare layer ($w_A$) and a content of said particles B in said antiglare layer ($w_B$) by a content of said binder matrix in said antiglare layer ($w_M$), being in the 0.10-0.40 range, and a quotient value ($w_B$/$w_A$), which is obtained by division of a content of said particles B in said antiglare layer ($w_B$) by a content of said particles A in said antiglare layer ($w_A$), being in the 0.50-1.50 range.

* * * * *